US010407353B2

(12) United States Patent
Rohrer et al.

(10) Patent No.: US 10,407,353 B2
(45) Date of Patent: Sep. 10, 2019

(54) MICRONUTRIENT FERTILIZER

(71) Applicant: Sun Chemical Corporation, Parsippany, NJ (US)

(72) Inventors: Anthony Rohrer, Centerville, OH (US); Jonathan Doll, Cincinnati, OH (US); Lisa Clapp, Cincinnati, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 133 days.

(21) Appl. No.: 15/509,672

(22) PCT Filed: Sep. 10, 2015

(86) PCT No.: PCT/US2015/049323
§ 371 (c)(1),
(2) Date: Mar. 8, 2017

(87) PCT Pub. No.: WO2016/040564
PCT Pub. Date: Mar. 17, 2016

(65) Prior Publication Data
US 2017/0283334 A1 Oct. 5, 2017

Related U.S. Application Data

(60) Provisional application No. 62/049,399, filed on Sep. 12, 2014.

(51) Int. Cl.
*C05D 9/02* (2006.01)
*C05F 11/00* (2006.01)
*C05G 3/00* (2006.01)
*C05D 5/00* (2006.01)

(52) U.S. Cl.
CPC ................ *C05D 9/02* (2013.01); *C05D 5/00* (2013.01); *C05F 11/00* (2013.01); *C05G 3/007* (2013.01); *C05G 3/0064* (2013.01); *C05G 3/0076* (2013.01)

(58) Field of Classification Search
CPC .......... C05D 9/02; C05D 5/00; C05G 3/0064; C05G 3/0076; C05F 11/00
See application file for complete search history.

(56) References Cited

U.S. PATENT DOCUMENTS

| 3,649,239 A | 3/1972 | Mitchell |
| 4,256,691 A * | 3/1981 | Ott ........................ C01B 17/10 252/389.52 |
| 5,174,805 A | 12/1992 | Masuda |
| 5,837,029 A | 11/1998 | Behel, Jr. et al. |
| 2006/0084573 A1 | 4/2006 | Grech et al. |

FOREIGN PATENT DOCUMENTS

| CN | 102344318 | * | 2/2012 |
| CN | 103804087 | * | 5/2014 |
| EP | 0274851 A1 | | 7/1988 |
| EP | 0592964 A1 | | 4/1994 |
| EP | 1486477 A1 | | 12/2004 |
| GB | 1308614 A | | 2/1973 |

OTHER PUBLICATIONS

International Search Report and Written Opinion for PCT Application No. PCT/US2015/049323, dated Nov. 30, 2015.

* cited by examiner

*Primary Examiner* — Jennifer A Smith
(74) *Attorney, Agent, or Firm* — Scott Conley; Howard Lee

(57) ABSTRACT

The present technology relates to a micronutrient fertilizer comprising immediate release and sustained release components contained within a hydrated polyelectrolyte solution. The fertilizer is readily dispersed and stable over long periods of time.

8 Claims, No Drawings

MICRONUTRIENT FERTILIZER

CROSS-REFERENCE TO RELATED APPLICATIONS

This application claims priority to U.S. provisional application No. 62/049,399, entitled, "Micronutrient Fertilizer," filed Sep. 12, 2014, which is incorporated by reference herein in its entirety.

BACKGROUND

Micronutrients are a required component in crop nutrition in order to sustain life and produce an abundant harvest. Formally, micronutrients are nutrients required by organisms in small quantities to enable a range of physiological functions. Micronutrients are also referred to as "trace elements" because only small amounts are required to facilitate the desired functions. The micronutrients found in soil are quickly depleted in a growing season and must be supplemented by the addition of fertilizers. It is also known that not all fertilizers are compatible with all micronutrients. For example, certain micronutrients may disrupt the solubility of nutrients, reducing the overall bioavailability. This is especially apparent in the case of zinc supplements used in conjunction with phosphate fertilizers, which forms insoluble zinc phosphate and reduces the efficacy of the fertilizer.

There are currently many micronutrient fertilizers on the market today. These vary widely in their composition and concentration. While many commercial products are a combination of both macro- and micronutrients the current technology is a highly concentrated micronutrient fertilizer. Other products attempt to reach the same level of concentration as seen in the current technology but fail to do so while maintaining long term stability in a liquid form. A common method to increase stability and rheology for fertilizer suspensions is through the addition of clays, primarily bentonite. These clays are used up to a 10% loading to increase the rheology. The use of clays, commonly found in drilling fluids and agricultural products leads to soil deposits, drainage issues, and salt build-up. With the high loadings found in bentonite suspension, the overall nutrient concentration is lowered. In light of this, there is a need for aqueous micronutrient fertilizers that have excellent stability, can be readily diluted without much stirring, do not hard pack on settling, and contain a high concentration of insoluble and soluble micronutrients. Surprisingly, it was discovered that these dispersion characteristics can be achieved by combining insoluble and soluble micronutrients with a polyelectrolyte and a metal complexing agent.

BRIEF SUMMARY

The formulation reported herein is for an aqueous micronutrient fertilizer dispersion composition for both immediate and sustained release of active components. The composition is comprised of an insoluble micronutrient, a soluble micronutrient, a polyelectrolyte and a metal complexing agent. This formulation is very shelf stable, easily diluted, non-hard packing and highly concentrated.

In addition, the ability to deliver a high concentration of active nutrient in a liquid, dispersible fertilizer makes the current technology unique. Inactive components may only be 20-35% of the total mass, leaving the remaining 65-80% comprised of active micronutrient components. This is possible through the use of a unique binder and dispersion aid. The polyelectrolyte can begin having a noticeable effect on the viscosity and stability at as little as a 0.1% loading. The only other inactive components are the metal complexing agent, necessary to render the ions inert, and the solvent. With such a simple, yet powerful formulation, high levels of active nutrient are easily realized.

The dual delivery system for both immediate and sustained release of active components found in the present technology adds another advantage. The present technology allows for nutrients for both immediate and continued absorption of nutrients over the growing season to prevent further nutritional deficiencies. The current technology allows for fewer applications throughout the lives of the crops and added benefits to the consumer.

DETAILED DESCRIPTION

The current technology describes a formulation for a liquid micronutrient fertilizer composition comprising an immediate release and sustained release components, that are comprised of a soluble and insoluble micronutrient, respectively. These two components may contain the same micronutrient allowing for a highly concentrated composition, or they may be a mixed formulation. Despite the high loading of active ingredients, the current technology is readily dispersible and shelf stable once dispersed. The low loading of polyelectrolytes with high water absorption makes this possible. Complexation of the soluble portion of nutrient ions allows for increased compatibility with the other components in the formulation and rheology control. The use of both complexing agents and polyelectrolytes allows for the tuning of viscosity and other physical properties that make the current technology unique. Because of this, the current technology occupies a unique space within the existing fertilizer market, with added benefit to the consumer. In addition, the current technology is composed entirely of environmentally compatible, biodegradable materials. The active ingredients are all cleared under CFR 180.910 and all materials are approved for food and nonfood use in the US by the EPA.

This technology relates to a formulation for a liquid micronutrient dispersion which contains both immediate release and sustained release components that are kept in suspension with the aid of a polyelectrolyte and a metal complexing agent. A unique characteristic of this fertilizer is its ability to be readily diluted with a high degree of stability and available nutrient concentration. Upon dilution, liquid micronutrient fertilizer dispersions do not hard pack, and the micronutrients can be readily redispersed, even after settling for over one week. This behavior is attributed to the combined effect of the polyelectrolyte and the metal complexing agent. If only one or neither of these ingredients are added, the micronutrient fertilizer concentrate does not perform adequately and high viscosities and/or hard packing are evident.

The current technology also incorporates a combination of polyelectrolytes with metal complexing agents to allow for a high concentration of micronutrients with good rheological stability. In the present technology, the polyelectrolyte acts as a thickener, dispersing agent, and a rheology modifier. Not being bound by theory, when exposed to polyvalent ions, these polyelectrolytes can physically cross-link to create a thick, gel-like matrix in which the solid micronutrients are dispersed. Additionally, soluble polyelectrolytes are capable of absorbing many times their mass in water, allowing for rapid dispersion in water-based systems. Biopolymer polyelectrolytes are an agriculturally friendly alternative to other synthetic dispersion aids or clays that can remain in the topsoil for long periods of time.

The soluble micronutrient may act as a physical cross-linker for the polyelectrolyte component. As a result, the soluble micronutrient is also a thickener. When the soluble micronutrient is combined with a metal complexing agent, the rheology may be be further modified. This results in a decrease in the viscosity that allows more micronutrients to be added to the formulation, increasing the fertilizer's efficiency. Additionally, the combined effect of the metal complexing agent, the polyelectrolyte and the soluble micronutrient allows the insoluble micronutrient to be readily dispersed in both concentrated and dilute forms. In dilute forms an added benefit is that hard packing of the insoluble micronutrient is avoided without the use of clay.

The liquid micronutrient fertilizer composition also contains an insoluble component suspended in a polyelectrolyte solution containing a soluble form of the same micronutrient. This technology can be applied to nearly all common agricultural micronutrients. This may include B, N, Mg, Al, Si, P, S, Cl, K, Ca, Cr, Mn, Fe, Co, Ni, Cu, Zn, Se, Mo, Ag, Sn, I, or mixtures thereof. The fertilizer produced using each of these nutrients will behave similarly due to the reaction of the polyelectrolyte biopolymer with any polycation. Even the anionic nutrient chloride can be supplied as the counter ion within the soluble component. In this way, the current technology becomes adaptable for many applications in the fertilizer industry.

In addition, the aqueous micronutrient fertilizer dispersion may optionally contain an acid or a base that is used for pH adjustment. A unique characteristic of this fertilizer is its ability to be readily dispersed and diluted while maintaining a high level of stability and a high concentration of micronutrients. The high dispersability and stability is due to the interaction of the polyelectrolyte and metal complexing agents with the soluble micronutrient ions and the polyelectrolyte.

Since the fertilizer contains immediately available crop micronutrients in a soluble form as well as sustained release nutrients found in an insoluble form, these two components create a product which can be applied once per growing season to correct any current deficiencies while providing a continued source of the micronutrient that will be released over time. The two component system is produced in a concentrated liquid form that can be readily diluted and remain shelf stable for long periods of time. The stability of the current technology is consistent through high temperature conditions as well as through freezing and thawing.

In general, the aqueous micronutrient fertilizer dispersion composition is produced by dissolving the soluble micronutrient and metal complexing agent in water. The polyelectrolyte is then solubilized and the pH may be adjusted. Finally, the insoluble micronutrient is slowly dispersed in the mixture to form the aqueous micronutrient fertilizer dispersion composition. This composition can be used as formulated or diluted for spray application. The aqueous micronutrient fertilizer composition may also be used as a seed coating. Furthermore, the aqueous micronutrient fertilizer dispersion may be dried to produce grains or prills of dry micronutrient fertilizer.

Micronutrients are typically elements that are required for plant metabolism at low levels. In the aqueous micronutrient fertilizer dispersion of the current technology, the total combined weight of both the insoluble micronutrient and the soluble micronutrient is in the range of about 25%-85%. In the aqueous micronutrient fertilizer composition, the total amount of the insoluble micronutrient may be any form of micronutrient that is not soluble in water or aqueous systems and is present at a concentration range of about 1%-80% by weight. The total amount of the soluble micronutrient may be any form of micronutrient that is soluble in water or aqueous systems and present at a concentration of about 0.5%-25% by weight. With respect to each other, the weight ratio of the soluble micronutrient to the insoluble micronutrient is any number in the range of about 1%-60%.

The micronutrients used in the current formulation may be one or more of the following: B, N, Mg, Al, Si, P, S, Cl, K, Ca, Cr, Mn, Fe, Co, Ni, Cu, Zn, Se, Mo, Ag, Sn, I, or mixtures thereof. In one embodiment the aqueous micronutrient fertilizer composition contains both insoluble micronutrients and soluble micronutrients. The combination of insoluble micronutrient and soluble micronutrient create an aqueous micronutrient fertilizer dispersion which can be applied once during a growing season to immediately correct any micronutrient deficiencies in the soil while providing a continued source of the micronutrient that can be released over time. Without being bound to theory, it is expected that the soluble micronutrient will be readily available to a plant, correcting any micronutrient deficiency, while the insoluble micronutrient will gradually convert to a soluble form over time. The benefit of having a combined system is that the aqueous micronutrient fertilizer dispersion of the current technology can be applied less times during a growing cycle than a liquid fertilizer containing only soluble micronutrients.

The insoluble and soluble micronutrients may be both of the same type of micronutrient, for example insoluble Mo and soluble Mo, or they may be mixtures of different micronutrients, for example insoluble Cu and soluble Zn, or insoluble Zn and soluble Cu, without effecting the scope of the current technology. Multiple insoluble and soluble micronutrients may be combined to form an aqueous micronutrient fertilizer composition. For example, an insoluble Zn may be combined with an insoluble Cu micronutrient and a soluble Fe micronutrient. In the case that a mixture of insoluble micronutrients is added, it may be that the molar amount of the different insoluble micronutrients are the same. Any combination of soluble and insoluble micronutrients is within the scope of this technology.

The insoluble micronutrient may be present as a particle. The insoluble micronutrient particle may have any shape without limiting the scope of the technology including spheres, platelets, rods, needles, whiskers, tetrapods, and/or mixtures of shapes. The insoluble micronutrient particle may be crystalline or amorphous. The particle size of the insoluble micronutrient particle may have a d50 in the range of 0.1 to 10 µm.

The insoluble micronutrient may be any form of micronutrient that is soluble in water or aqueous systems at a concentration of about 0.099 g/mL or less. Examples of the insoluble micronutrients may be any one of the following: elemental boron, boron nitride, boron carbide, elemental magnesium, magnesium carbonate, dolomite, hydrated dolomite, magnesium hydroxide, magnesium oxide, magnesium oxalate, struvite, elemental aluminum, aluminum dodecaboride, aluminum oxide, aluminum hydroxide, bauxite, elemental silicon, silicon dioxide, elemental sulfur, calcium sulfate, gypsum, calcium carbonate, calcium phosphate, calcitic limestone, eggshells, bonemeal, calcium apatite, elemental chromium, chromium phosphate, chromium (III) oxide, elemental manganese, rhodochrosite, manganese (II) oxide, elemental iron, iron (II) oxide, iron (III) oxide, iron hydroxide, iron sucrate, elemental cobalt, cobalt (II) oxide, cobalt (III) oxide, cobalt (II, III) oxide, cobalt (II) hydroxide, cobalt (III) hydroxide, Cobalt (II) sulfide, cobalt (II) selenide, cobalt (II) phosphide, cobalt (II) cyanide, elemental nickel, nickel (II) oxide, nickel (III) oxide, nickel oxyhydroxide, nickel (II) carbonate, nickel (II) chromate, nickel (II) hydroxide, millerite, nickel (II) selenide, nickel titanate, nickel phosphide, elemental copper, copper (I) cyanide, copper chromite, copper (I) oxide, chalcocite, copper (I) selenide, copper (I) phosphide, copper (II) oxide, copper (II) carbonate, copper (II) phosphate, covellite, copper (II) selenide, copper (II) arsenate, elemental silver, silver chloride, silver bromide, silver iodide, silver oxide, elemental zinc, zinc cyanide, zinc chromate, zinc molybdate, zinc oxide, zinc hydroxide, zinc nitride, zinc blende, wurtzite, zinc selenide, zinc telluride, zinc pyrophosphate, zinc phosphide, zinc phosphate, tin (II) oxide, tin (II) hydroxide, tin (II) sulfide, tin (II) selenide, tin (IV) oxide, tin (IV) sulfide, and mixtures and alloys thereof. It should be noted that this list is not to restrict the current technology and any common micronutrient known to the art may be utilized.

The soluble micronutrient may be any form of micronutrient that is soluble in water or aqueous systems at a concentration of at least about 0.1 g/mL. Examples of the soluble micronutrient may be any one of the following group: boric acid, borax, boron trichloride, boron trifloride, boron tribromide, boron triiodide, boron trioxide, sodium borohydride, disodium octaborate tetrahydrate, orthoboric acid, potassium tetraborate, calcium borate, magnesium chloride, magnesium fluoride, magnesium bromide, magnesium iodide, magnesium nitrate, magnesium sulfate, magnesium sulfite, magnesium acetate, magnesium citrate, magnesium chromate, magnesium bicarbonate, magnesium perchlorate, aluminum nitrate, aluminum chloride, aluminum fluoride, aluminum bromide, aluminum iodide, aluminum sulfate, aluminum hydroxide, aluminum molybdate, potassium aluminum sulfate, sodium silicate, silicic acid, sulfuric acid, sodium sulfide, calcium carbonate, calcium chloride, calcium sulfate, calcium nitrate, lime, calcium ammonium citrate, calcium citrate, chromium (III) chloride, chromium (III) bromide, chromium (III) iodide, chromium (III) nitrate, hydrated chromium (III) sulfate, chromic acid, potassium chromate, potassium dichromate, manganese nitrate, manganese chloride, manganese bromide, manganese iodide, manganese sulfate, manganese oxysulfate, manganese acetate, manganese citrate, permanganic acid, potassium permanganate, sodium manganate, silver nitrate, silver fluoride, iron (II) chloride, iron (II) bromide, iron (II) sulphate, iron (II) acetate, iron (II) citrate, iron (II) gluconate, iron (II) lactate, iron (III) nitrate, iron (III) chloride, iron (III) oxychloride, potassium ferrite, potassium ferricyanide, potassium ferrioxalate, potassium chloride, potassium iodide, potassium bromide, potassium nitrate, potassium bicarbonate, potassium chromate, potassium dichromate, potassium phosphate, potassium hydroxide, potassium sulfate, and mixtures thereof. It should be noted that this list is not to restrict the current technology and any common micronutrient known to the art may be utilized.

The aqueous micronutrient fertilizer composition also comprises a polyelectrolyte. The polyelectrolyte is a polymer that has an ionic charge that is repeated along the polymer. The ionic charge on the polymer can be either positive, negative or a mixture of positive and negative charges. The polyelectrolyte may be soluble in water, or other polar solvents.

The polyelectrolyte also plays a role in the stability of the micronutrient fertilizer composition. Polyelectrolyte biopolymers absorb large excesses of water forming a weak hydrogel. This hydrogel enhances the suspension of the insoluble, sustained release component and hinders settling. Furthermore, once the product does settle, given enough time, the micronutrient fertilizer composition is readily redispersed with no hard packing. This is a key advantage over other commercial products as the shelf life of not only the current technology, but its end use application, is drastically improved.

The polyelectrolyte is added to the aqueous micronutrient fertilizer composition at a concentration of about 0.1% - 10% by weight with respect to the total weight of the aqueous micronutrient fertilizer dispersion composition. The polyelectrolyte may be a natural polymer such as a carbohydrate or protein, or it can be a synthetic polymer such as a polyacrylate. The polyelectrolyte may be a blend of polymers, a copolymer or block copolymer. Additionally, the morphology of the polyelectrolyte may be linear, branched, hyperbranched, comb, or star. The polyelectrolyte may be one or more of the following: alginic acid, sodium alginate, humic acid, pectin, chitosan, gelatin, polylysine, polyarginine, polyhistidine, polyaspartate, polygluconate, DNA, RNA, polylactate, soluble lingo sulfonate, gelatin, humic acid, polyacrylic acid, polystyrene sulfonate, poly (allylamine hydrochloride), poly(ethylenimine hydrochloride), N-alkyl-polyethylenimine, nafion. It should be noted that this list is not restrictive and any polyelectrolyte known to the art may be utilized.

The polyelectrolyte in the aqueous micronutrient fertilizer dispersion aids in stabilizing the dispersion of the insoluble micronutrient. Not being bound by theory, it is believed that the soluble micronutrient interacts with the polyelectrolyte to form physical crosslinks between the polyelectrolyte chains. The physical crosslinking of the polyelectrolyte is thought to help keep the insoluble micronutrient in suspension, while still retaining the bioavailability of the soluble micronutrient.

The aqueous micronutrient fertilizer composition is also comprised of a metal complexing agent. The metal complexing agent can combine with the cation of the soluble micronutrient. Not being bound by theory, this is thought to have the effect of reducing the viscosity of the aqueous micronutrient fertilizer dispersion because the metal complexing agent and the polyelectrolyte compete for the soluble micronutrient. This in turn allows for higher loadings of the soluble micronutrient in the system. An additional benefit of the metal complexing agent is to stabilize the soluble micronutrient at different pH's depending on the system.

The metal complexing agent is added to the aqueous micronutrient fertilizer composition at a concentration of about 1% - 20% by weight with respect to the total weight of the aqueous micronutrient fertilizer dispersion. The metal complexing agent can be any organic or inorganic molecule that forms a complex with a metal. Examples of suitable metal complexing agent may be one or more of the following: ammonia, citric acid, folic acid, ethylenediamine, ethylenediaminetetracetic acid, N-(hydroxyethyl) ethylenediaminetriacetic acid, diethylenetriamine pentacetic acid, ethylenediamineди(o-hydroxyphenylacetic) acid, ethylenediaminedi(o-hydroxy-p-methylphenyl) acetic acid, ethylenediaminedi(5-carboxy-2-hydroxyphenyl)acetic acid, nitrilotriacetic acid, glucoheptonic acid, ascorbic acid, fumaric acid, gluconic acid, lactic acid, malic acid, nitrilotriacetic acid, pentetic acid, tartaric acid, glycine, alanine, proline, leucine, isoleucine, threonine, serine, tryptophan, tyrosine, valine, phenylalanine, methionine, lysine, arginine, histidine, glutamine, glutamic acid, aspartic acid, asparagine, cysteine, taurine, lanthionine, 2-aminoisobutyric acid, dehydroalanine, citruline, ornithine, pantothenic acid, oxalic acid, tetrathiooxalate salts, 12-crown-4, 15-crown-5, 18-crown-6, dibenzo-18-crown-6, and diaza-18-crown-6, [2.2.2]cryptand, ethylene glycol-bis(2-aminoethylether)-N, N,N',N'-tetraacetic acid, and mixtures thereof. It should be noted that any complexing agent known in the art may be utilized.

It may be necessary to optionally adjust the pH of the aqueous micronutrient fertilizer dispersion. In this case any dilute acid or base known to those skilled in the art may be used. Additionally, the pH may need to be adjusted to complex the soluble micronutrient with the metal complexing agent. The pH of the aqueous micronutrient fertilizer dispersion is in the range of about 6.0-10.0, however other pH values may be used without limiting the scope of the technology.

The present aqueous micronutrient fertilizer composition displays a high level of stability and dispensability. The present formulation allows for the use of any desired pH and specifically those of an alkaline nature while maintaining soluble stability of the micronutrients. While not being bound by theory, it is thought that the addition of a complexing agent results in the soluble metal salts becoming inert and allows solubility at a wider range of pH values. This allows for the addition of previously incompatible systems without any loss in solubility.

In a further embodiment, the addition of any water miscible solvents, known to those skilled in the art, may be deemed advantageous. If present, these solvents may be used at up to about 10% by weight and include but are not limited to: methanol, ethanol, propanol, isopropanol, dimethylformamide, ethylene glycol, acetone, acetonitrile, nitromethane, tetrahydrofuran, dichloromethane, dimethyl sulfoxide and mixtures thereof.

The aqueous micronutrient fertilizer composition may also be optionally colored using any colorants known to those in the art. Suitable colorant types include all, organic, inorganic, metallic, and pearlescent pigments, as well as dyes. If the aqueous micronutrient fertilizer is colored, then the colorant is added at a level of about 0% -15% with respect to the total weight of the micronutrient dispersion. One colorant or a blend of colorants may be used without limiting the scope of the current technology.

If an organic pigment is used as a colorant for the aqueous micronutrient fertilizer dispersion, the types of organic pigments that can be used in the current technology includes azo pigments, polycylic pigments, anthraquinone pigments including monoazo pigments, disazo pigments, disazo condensation pigments, naphthol pigments, benzimidazolone pigments, isoindolinone pigments, isoindoline pigments, metal complex pigments, quinacridone pigments, perylene pigments, carbon black pigments, phthalocyanine pigments, perinone pigments, diketopyrrolo-pyrrole pigments, thioindigo pigments, anthropyrimidine pigments, flavanthrone pigments, anthanthrone pigments, dioxazine pigments, triarylcarbonium pigments, quinophthalone pigments, or any combination thereof. It should be noted that this list is not inclusive and any complexing agent known to the art may be utilized.

If an inorganic pigment is used as a colorant for the aqueous micronutrient fertilizer dispersion then the types of inorganic pigments that can be used includes all types of titanium oxides, iron oxides, vanadium oxides, chromium oxides, manganese oxides, tungsten oxides, cadmium sulfides, zinc sulfides, cadmium mercury sulfides, iron sulfides, aluminosilicates, aluminum oxides, cerium oxides, spinel pigments, lanthanum hexaborides and mixtures and alloys thereof. It should be noted that this list is not restricted and any pigment known to the art may be utilized.

If a metallic pigment is used as a colorant for the aqueous micronutrient fertilizer dispersion then the types of metallic pigments used may be platelet-shaped metal flakes of at least one of the following group comprised of metallic aluminum, copper, zinc, iron, titanium, silver, gold, and mixtures and alloys thereof. Additionally, the metallic pigment may be coated with a material to impart stability and/or dispersability. Suitable coating materials include, fatty acids, silica, aluminum oxide, iron oxide, titanium dioxide, zinc oxide, acrylic polymers, phosphate esters, and other coating materials known to those skilled in the art.

If a pearlescent pigment is used as a colorant for the aqueous micronutrient fertilizer dispersion then all types of pearlescent pigments that can be used. Pearlescent pigments are defined as having a nonmetallic platelet that is coated with one or more layers of a metal oxide. Suitable nonmetallic platelets are natural and synthetic mica, borosilicate glass, silica, graphite, aluminum oxide, sapphire, micaceous iron oxide, hexagonal boron nitride, and/or other suitable platelet materials known to those skilled in the art. The nonmetallic platelet may be coated with one or more layers of metal oxides from the group comprised of silicon dioxide, iron oxide, titanium dioxide, zinc oxide, chromium oxide, cerium oxide, zirconium oxide, and other metal oxides known to those skilled in the art.

In a further embodiment of the current technology, additional agrichemical products may also be added to the aqueous micronutrient fertilizer dispersion. Suitable agrichemicals include, but are not limited to, any from the following classes of compounds: compost, manure, herbicides, pesticides, fungicides, bactericides, vitamins, proteins, amino acids, lipids, macronutrients and others known to those skilled in the art.

The aqueous micronutrient fertilizer dispersion can be used as described or diluted without affecting the scope of the current disclosure. The aqueous micronutrient fertilizer dispersion can be applied to plants by any method known to those skilled in the art, including injection, surface broadcast, broadcast incorporated, band application, fertigation, foliar application, sidedressing, topdressing and seed placement. Additionally, the aqueous micronutrient fertilizer dispersion may be sprayed onto seeds and dried for use as a seed coating. The aqueous micronutrient fertilizer composition may also be dried and comminuted for use as a dry fertilizer. Any method known to those skilled in the art to make dry fertilizer is acceptable for drying the aqueous micronutrient fertilizer, including, but not limited to air drying, oven drying, spray drying and the like.

The aqueous micronutrient fertilizer composition has been described in detail, including the preferred embodiments thereof. However, it will be appreciated that those skilled in the art, upon consideration of the present disclosure, may make modifications and/or improvements on this technology that fall within the scope and spirit of this disclosure.

EXAMPLES

The following examples illustrate specific aspects of the present technology and are not intended to limit the scope thereof in any respect and should not be so construed.

Example 1

A solution consisting of 5 g urea, 2.5 g ethylenediaminetetraacetic acid (EDTA) and 2 g zinc nitrate hexahydrate was prepared in 25 g deionized H2O. The pH was adjusted to 8 with a 50% NaOH solution to aid in disolution. To 35 g of this solution, 2 g sodium alginate was added and stirred via magnetic stir bar until hydrated. Finally, 25 g ZnO was stirred into the alginate solution while adding 4 g deionized $H_2O$ to improve viscosity. The final product was 28% elemental zinc (w/w). The thick gel displayed high levels of stability and dispersed readily in water.

Example 2

A solution was prepared by dissolving 2.5 g EDTA in 15 g of 30% ammonium hydroxide (NH4OH) and was then diluted with 20 g deionized $H_2O$. To this solution, 2 g $ZnSO_4.6H_2O$ was added. Once dissolved, 1 g sodium alginate was stirred in with the use of a magnetic stir bar. Without hesitation, 25 g ZnO was added to the solution. The thick paste was allowed to stir for 1 hour to hydrate. The resulting product contained 31% elemental zinc (w/w) and dispersed readily.

Example 3

A solution was prepared by dissolving 60 g $ZnSO_4.H_2O$ and 30 g citric acid anhydrous in a minimal amount of deionized water. The pH was then adjusted to 9 using 30% $NH_4OH$. The solution was then diluted with deionized water so that the total liquid mass came to 490 g. Under agitation with a paddle blade at 500 rpm, 20 g sodium alginate was added to the solution. Once hydration of the alginate had begun, 400 g ZnO was slowly added. The thick paste was allowed to stir for another 30 min. The resulting paste contained 34.2% Zn (w/w).

Example 4

A solution was prepared by dissolving 60 g $ZnSO_4.H_2O$ and 90 g citric acid anhydrous in a minimal amount of deionized water. The pH was then adjusted to 9 using 30% $NH_4OH$. The solution was then diluted with deionized water so that the total liquid mass came to 435 g. Under agitation with a paddle blade at 500 rpm, 15 g sodium alginate was added to the solution. Once hydration of the alginate had begun, 400 g ZnO was slowly added. The thick paste was allowed to stir for another 30 min. The resulting paste contained 34.2% Zn (w/w).

Example 5

A solution was prepared by dissolving 40 g $ZnSO_4.H_2O$ and 48 g citric acid anhydrous in a minimal amount of deionized water. The pH was then adjusted to 7 using 30% $NH_4OH$. The solution was then diluted with deionized water so that the total liquid mass came to 458 g. Under agitation with a paddle blade at 500 rpm, 10 g sodium alginate was added to the solution. Once hydration of the alginate had begun, 444 g ZnO was slowly added. The thick paste was allowed to stir for another 30 min. The resulting paste contained 37% Zn (w/w).

Example 6

A solution was prepared by dissolving 40 g $ZnSO_4.H_2O$ and 90 g citric acid anhydrous in a minimal amount of deionized water. The pH was then adjusted to 9 using 30% $NH_4OH$. The solution was then diluted with deionized water so that the total liquid mass came to 264 g. Under agitation with a paddle blade at 500 rpm, 10 g sodium alginate was added to the solution. Once hydration of the alginate had begun, 600 g ZnO was slowly added. The thick paste was allowed to stir for another 30 min. The resulting paste contained 49% Zn (w/w).

Example 7

A solution was prepared by dissolving 90 g $MgCl_2$ and 30 g tartaric acid in a minimal amount of deionized water. The pH was then adjusted to 7 using 30% $NH_4OH$. The solution was then diluted with deionized water so that the total liquid mass came to 233 g. Under agitation with a paddle blade at 500 rpm, 7.5 g sodium alginate was added to the solution. Once hydration of the alginate had begun, 100 g MgO was slowly added. The thick paste was allowed to stir for another 30 min. The dispersion behaved similarly to the other examples of the invention.

Example 8

A solution was prepared by dissolving 20 g $FeSO_4.7H_2O$, 40 g anhydrous citric acid, and 5 g glycine in a minimal amount of deionized water. The pH was then adjusted to 6 using 30% $NH_4OH$. The solution was then diluted with deionized water so that the total liquid mass came to 138 g. Under agitation with a paddle blade at 500 rpm, 5 g sodium alginate was added to the solution. Once hydration of the alginate had begun, 275 g yellow iron oxide was slowly added. The thick paste was allowed to stir for another 30 min. The resulting dispersion contained 37% Fe (w/w) and behaved similarly to previous examples of the current invention.

Comparative Example 1

The market product Zinc DDP (WolfTrax®, Winnipeg, Canada)

Comparative Example 2

The market product Activist Max (AgriChem®, Yatala, Australia)

Comparative Example 3

A solution was prepared by dissolving 20 g $ZnSO_4.H_2O$ and 45 g citric acid anhydrous in a minimal amount of deionized water. The pH was then adjusted to 9 using 30% $NH_4OH$. The solution was then diluted with deionized water so that the total liquid mass came to 132 g. Under agitation with a paddle blade at 500 rpm, 300 g ZnO was slowly added. The thick paste was allowed to stir for another 30 min.

Comparative Example 4

A solution was prepared by dissolving 20 g $ZnSO_4.H_2O$ in a minimal amount of deionized water. The pH was then adjusted to 9 using 30% $NH_4OH$. The solution was then diluted with deionized water so that the total liquid mass came to 132 g. Under agitation with a paddle blade at 500 rpm, 300 g ZnO was slowly added. The resulting gel could not be mixed and did not produce a homogenous product.

Evaluation of the Fertilizers

Samples from a selection of the above examples were tested for dispersability into a water system. From the selected examples, 20 g of the fertilizer was dispersed into 80 of deionized water using a high shear blade at 1300 rpm for 5 min. The resulting dispersion was then measured on a Hegman grind gauge and the largest aggregate size recorded in microns. This data is reported in Table 1.

TABLE 1

Grind Gauge Readings for Dispersed Fertilizers

| Sample | Grind Gauge Reading (μm) |
| --- | --- |
| Example 3 | 48.3 |
| Example 4 | 43.6 |
| Example 6 | 42.6 |
| Comparative Example 1 | >60* |

*Above the maximum reading of the scale

The data in Table 1 shows a clear distinction over other highly concentrated fertilizers. A quick dispersion to a small, uniform particle size is deemed advantageous by those skilled in the art. Comparative Example 2 is a low viscosity fertilizer with a lower concentration. Due to its fluid-like consistency, very little work is required for dispersion.

Viscosity:

Samples from a selection of the above examples were tested for viscosity after a dilution to a concentration of 10% total zinc. For each sample, 20 g of the dilution was mixed for 5 min in a Speedmixer (DAC150FVZ-K) from Flack-Teck, Inc. at 3000 rpm. The viscosities were recorded using a #63 spindle in a Brookfield viscometer at 60 rpm.

TABLE 2

Viscosities for Fertilizer Dilutions

| Sample | Viscosity (cP) |
| --- | --- |
| Example 3 | 30 |
| Example 4 | 12 |
| Example 6 | 5 |
| Comparative Example 1 | 385 |

Once diluted to a standardized concentration, embodiments of the current technology have lower viscosities compared to other similar fertilizers as seen in Table 2. This facilitates handling in most applications. Due to the high concentration, very little material is required to reach the desired dilute concentration.

Settling:

Samples from a selection of the above examples were tested for their settling properties in a water dispersion. From the selected examples, 1 g of the fertilizer was dispersed into 19 g of deionized water using a high shear blade at 1300 rpm for 5 min. The resulting dispersion was then left to sit for 60 hr. at room temperature, undisturbed. The ratio of the height of the opaque portion of the dispersion to the total height of the solution was calculated. This data is reported in Table 3.

TABLE 3

Settling Data for Fertilizers

| Sample | Settling Ratio |
| --- | --- |
| Example 3 | 0.884 |
| Example 4 | 0.804 |
| Example 6 | 0.914 |
| Comparative Example 1 | 0.675 |
| Comparative Example 2 | 0.513 |

After 60 hr. all the fertilizers displayed varying degrees of separation and settling. All of the embodiments of the current technology displayed low levels of separation while retaining 80% or more of their dispersion. The stability and particularly the settling of material are of major concern to those skilled in the art. The data presented in Table 3 shows a distinct advantage of the current technology over other fertilizers.

Settling stability:

Samples from a selection of the above examples were tested for their settling stability after a dilution in water. From the selected examples, 1 g of the fertilizer was dispersed into 19 g of deionized water using a high shear blade at 1300 rpm for 5 min into a tared vial. The resulting dispersion was then left to sit undisturbed for 60 hr. at room temperature, undisturbed. After settling, the samples were redispersed at 1800 rpm for 10 s (IKA MV1). After decanting the dispersed solution, the mass of remaining undispersed fertilizer remaining in the vial is recorded. This data is reported in Table 4.

TABLE 4

Redispersion Testing Results for Fertilizers

| Sample | Undispersed Mass (g) |
| --- | --- |
| Example 3 | 0.1 |
| Example 4 | 0.0 |
| Example 6 | 0.0 |
| Comparative Example 1 | 1.2 |
| Comparative Example 2 | 2.7 |

The data presented in Table 4 clearly demonstrates the stability of the current technology and its dilutions. While the dispersions do settle over time they can be easily redispersed with minimal work required. When the dilutions are lightly stirred 90-100% of the current technology redisperses. Comparative Examples 1 and 2 do not redisperse with the same ease and create a hard pack once settled.

Fertilizers with the ability to not only disperse easily but also to stay dispersed and redispersed as needed are seen as advantageous to those skilled in the art. The current technology is able to achieve these properties with its unique use of polyelectrolytes and metal complexing agents. Comparative Example 3 demonstrates the role of the complexing agent. Without the complexing agent a homogenous product cannot be achieved due to incompatibility of the soluble nutrient, the insoluble nutrient, and the polyelectrolyte together. Comparative Example 4 demonstrates the role of the polyelectrolyte. Without the polyelectrolyte the fertilizer is of too low a viscosity and the dispersions are not stable and hard pack quickly. Likewise, the undiluted fertilizer begins to separate after sitting within the span of a few days.

What is claimed is:

1. A liquid micronutrient fertilizer composition comprising an aqueous dispersion of soluble and insoluble micronutrients, a polyelectrolyte, and a metal complexing agent;
   wherein the total combined weight of both the insoluble micronutrient and the soluble micronutrient about 25%-85% by weight, wherein the polyelectrolyte is added to the aqueous micronutrient fertilizer dispersion at a concentration of about 0.1% - 10%, by weight, with respect to the total weight of the micronutrient fertilizer composition; and
   wherein the metal complexing agent is present in a concentration of about 1%-20% by weight, with respect to total weight of the micronutrient fertilizer composition; and
   wherein the polyelectrolyte comprises at least one polymer selected from the group consisting of alginic acid, sodium alginate, humic acid, chitosan, polylignosulfonate, polyacrylic acid, and polystyrene sulfonate; and
   wherein the metal complexing agent comprises at least one metal complexing agent selected from the group consisting of citric acid, ethylenediaminetetracetic acid, tartaric acid, and mixtures thereof; and
   wherein the soluble micronutrient comprises at least one micronutrient selected from the group consisting of magnesium chloride, magnesium citrate, iron (II) sulphate, iron (II) citrate, zinc sulfate, boron trichloride magnesium sulfate, aluminum chloride, aluminum sulfate, potassium aluminum sulfate, calcium chloride, calcium sulfate, calcium ammonium citrate, calcium citrate, hydrated chromium (III) sulfate, manganese chloride, manganese sulfate, manganese oxysulfate, manganese citrate, iron (II) chloride, iron (III) chloride, iron (III) oxychloride, potassium chloride, potassium sulfate, and mixtures thereof; and
   wherein the insoluble micronutrient comprises at least one micronutrient selected from the group consisting of magnesium oxide, iron (II) oxide, iron (III) oxide, zinc oxide, iron hydroxide, elemental boron, elemental magnesium, magnesium carbonate, dolomite, hydrated dolomite, magnesium hydroxide, magnesium oxalate, struvite, calcium sulfate, gypsum, calcium carbonate, calcium phosphate, calcitic limestone, eggshells, bonemeal, calcium apatite, copper (I) oxide, copper (II) oxide, copper carbonate, copper (II) phosphate, elemental zinc, zinc chromate, zinc molybdate, zinc hydroxide, zinc nitride, zinc blende, wurtzite, zinc pyrophosphate, zinc phosphide, zinc phosphate, elemental manganese, manganese (II) oxide, and mixtures thereof.

2. The composition of claim 1, wherein the polyelectrolyte comprises at least one polymer selected from the group consisting of alginic acid, and sodium alginate.

3. The composition of claim 1, wherein the soluble micronutrient comprises at least one micronutrient selected from the group consisting of zinc nitrate, zinc sulfate, magnesium chloride, iron (II) sulfate, and combinations thereof.

4. The composition of claim 1, wherein the insoluble micronutrient comprises at least one micronutrient selected from the group consisting of zinc oxide, magnesium oxide, iron (II) oxide, iron (III) oxide, iron hydroxide, and combinations thereof.

5. The composition of claim 1, wherein pH of the micronutrient fertilizer composition is from about 6.0 to about 10.0.

6. The composition of claim 2, wherein the soluble micronutrient comprises at least one micronutrient selected from the group consisting of zinc nitrate, zinc sulfate, magnesium chloride, iron (II) sulfate, and combinations thereof.

7. The composition of claim 6, wherein the insoluble micronutrient comprises at least one micronutrient selected from the group consisting of zinc oxide, magnesium oxide, iron (II) oxide, iron (III) oxide, iron hydroxide, and combinations thereof.

8. The composition of claim 7, wherein pH of the micronutrient fertilizer composition is from about 6.0 to about 10.0.

* * * * *